United States Patent [19]

Ross

[11] Patent Number: 4,820,162
[45] Date of Patent: Apr. 11, 1989

[54] JOYSTICK CONTROL ACCESSORY FOR COMPUTERIZED AIRCRAFT FLIGHT SIMULATION PROGRAM

[76] Inventor: Robert Ross, 10502 Katella, Anaheim, Calif. 92804

[21] Appl. No.: 124,054

[22] Filed: Nov. 23, 1987

[51] Int. Cl.$^4$ .................................................. A63F 9/22
[52] U.S. Cl. .............................. 434/45; 273/DIG. 28; 273/148 B; 200/6 A
[58] Field of Search ................... 273/148 B, DIG. 28; 200/6 A; 434/45

[56] References Cited

U.S. PATENT DOCUMENTS

| | | | |
|---|---|---|---|
| 3,193,784 | 7/1965 | Lautzenhiser | 273/148 B |
| 3,550,466 | 12/1970 | Ham | 200/6 A |
| 4,161,726 | 7/1979 | Burson et al. | 273/148 B |
| 4,291,213 | 9/1981 | Felland et al. | 200/6 A |

*Primary Examiner*—Leo P. Picard
*Attorney, Agent, or Firm*—Charles H. Thomas

[57] ABSTRACT

An accessory is provided for a computerized aircraft flight simulation program which employs a control stick assembly to simulate the forces on and movement of an aircraft control stick which a pilot would actually experience in flight. The accessory employs a joystick extension of at least fifteen inches in length and four springs which extend in orthogonal directions from the joystick extension over pulleys on upright mounting posts to anchoring locations near a mounting base to which the posts are attached. The springs are maintained in tension and are long enough to produce realistic sensations of resistance which a pilot actually experiences in operating the control stick of an aircraft. The springs are arranged in linearly aligned pairs with the springs in each pair working in opposition to each other. Tension on the springs in one pair can be adjusted to simulate elevator trim control in an aircraft. Tension on a spring in the other pair can be adjusted to simulate rudder trim control in an aircraft.

12 Claims, 2 Drawing Sheets

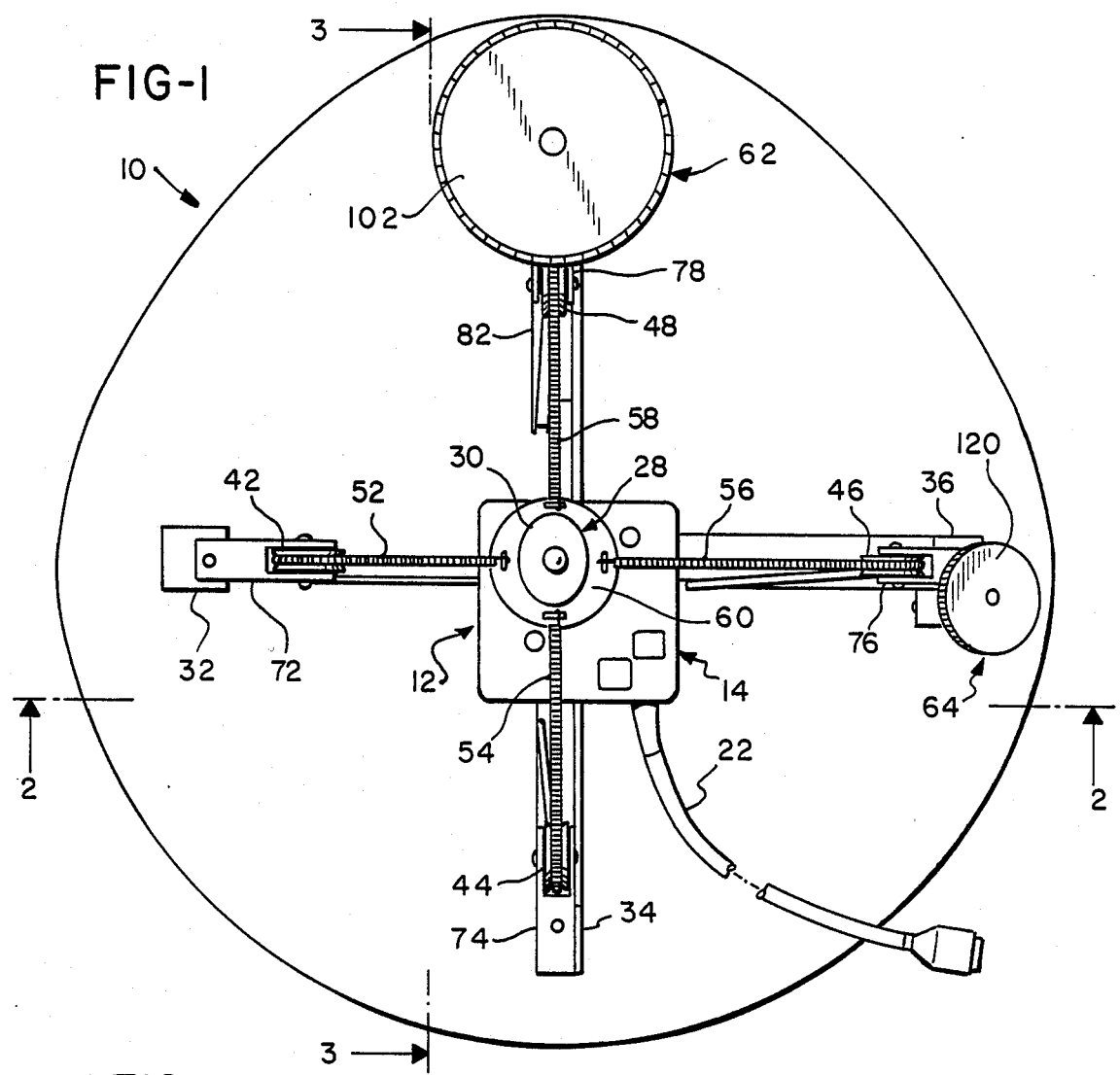
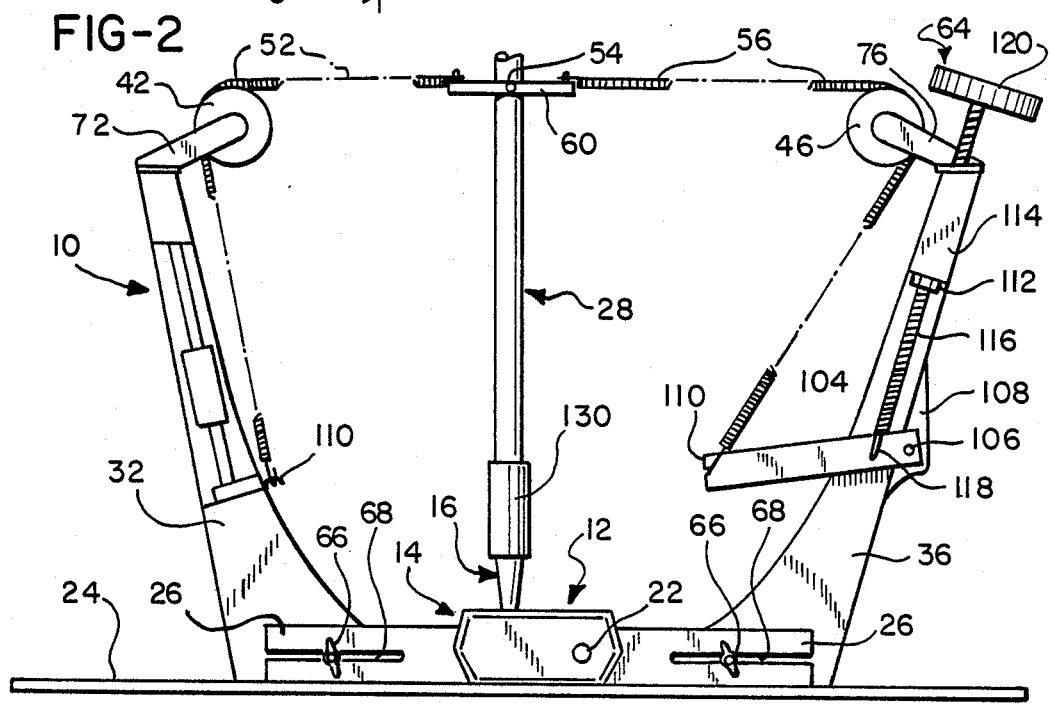

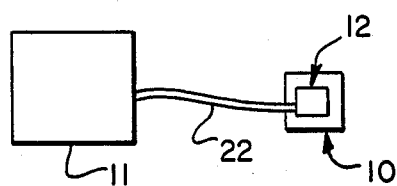
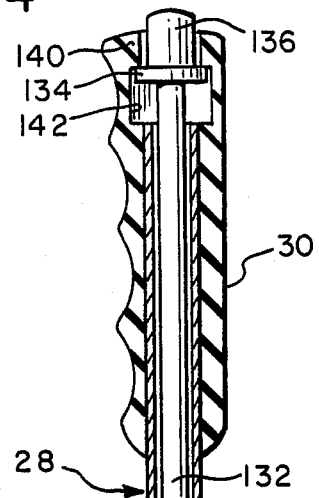
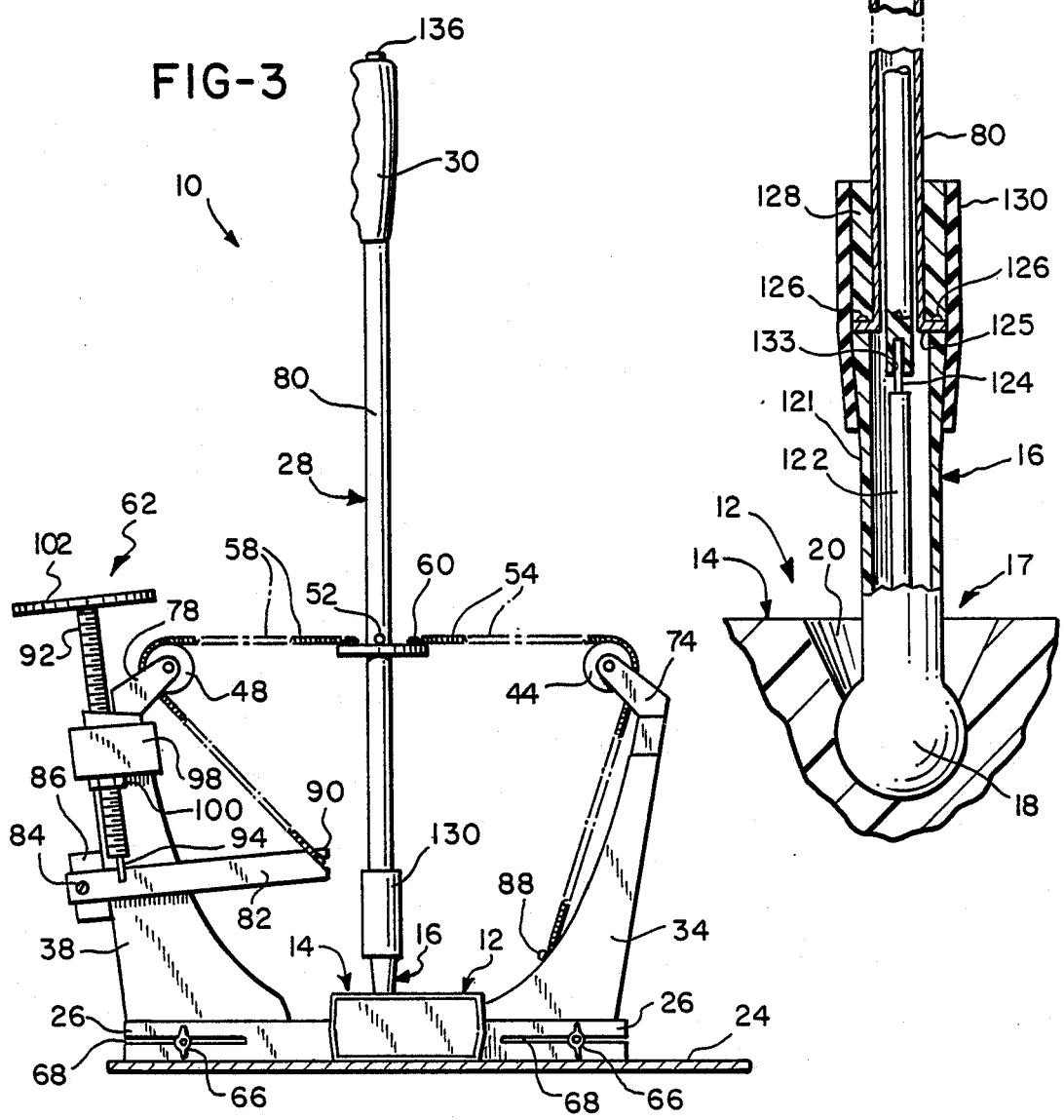

JOYSTICK CONTROL ACCESSORY FOR COMPUTERIZED AIRCRAFT FLIGHT SIMULATION PROGRAM

BACKGROUND OF THE INVENTION

1. Field of the Invention

The present invention is related to a joystick control for use with a computer that is loaded with an aircraft flight simulator program and equipped with a computer joystick assembly having a housing and a joystick lever electrically coupled to provide inputs to the computer.

2. Description of the Prior Art

In recent years a number of different flight simulation computer software programs have been developed for use with different types of personal computers. A typical flight simulation computer software program creates an electronically generated CRT display that simulates the images which a pilot sees from the cockpit of an aircraft and images of instrument readings which a pilot would see in actually flying an aircraft. To achieve interaction with a person operating the computer loaded with the flight simulation program, a computer joystick assembly is typically provided. The computer joystick assembly allows the operator to provide inputs to the computer indicative of actions which the operator would take within the cockpit while flying an aircraft. These inputs are electronically encoded within the computer, and the CRT display of the computer is altered to indicate the results which the operator inputs would have upon the images viewed from the cockpit of the aircraft and upon the instrument readings within the cockpit of the aircraft.

A typical computer joystick assembly includes a rigid casing, usually formed as a generally rectangular box-shaped plastic housing, and a small control lever joined to the housing by a pivot connection and protruding upwardly therefrom. A computer joystick control lever is typically on the order of about three inches in length, and seldom exceeds five inches in length. Also, a computer joystick control lever is manipulated by gripping the upwardly projecting extremity of the control lever between the thumb and finger of one hand, while cradling or stabilizing the computer joystick assembly housing with the other hand. Since the control lever of a computer joystick control assembly is so short, the maximum movement of the free extremity of the lever in any direction is usually on the order of less than two inches. While the control lever of a computer joystick assembly is spring biased to a centered position, the control lever can be deflected to a maximum extent with a force of less than an ounce, which may be applied by a single finger of one hand. These two factors, namely relatively small movement with little resistance to such movements, typically result in overcontrol of an aircraft leading to erratic flight.

The control stick of an actual aircraft, on the other hand, is often a stick which is typically at least fifteen inches in length and is equipped with a handgrip at its upwardly projecting extremity. The handgrip is of a size and shape adapted to be grasped by the pilot with one hand such that the fingers of the hand curl around the grip in one direction, and the thumb wraps around the grip in the opposite direction. In contrast to the movement of a control lever of a computer joystick assembly, the actual control stick of an aircraft will move a distance typically on the order of about nine or ten inches at its extremity, which more nearly approximates the degree of movement used in actual flying. Moreover, when a pilot actually does laterally deflect the control stick to alter the attitude of the aircraft, the pilot will feel a significant resisting force transmitted through the control stick. The pilot must exert a countervailing force which is easily in excess of a pound applied at the handgrip in order to effectuate the translational movement of the aircraft control stick that is desired, giving a more realistic "feel" to the control stick.

In an actual aircraft the pilot has available manually rotatable twin adjustments which impart a desired attitude to the aircraft by moving the nose up or down and/or right or left. That is, the pilot of an actual aircraft has an adjustment which will maintain a particular force upon the tail elevators and rudder so as to exert a bias to effectuate trim control, which is necessary under most flight situations. In a computer joystick assembly, on the other hand, the operator does not have any means for applying any type of bias to the joystick assembly lever.

While conventional flight simulation computer software programs for use with home computers are fairly realistic in representing visual images that a pilot is likely to experience in flying an aircraft, tactile sensations which a pilot experiences in actually flying an aircraft have been almost totally ignored. Virtually all pilots who operate a home computer flight simulation program would agree that there is practically no "feel" of flying associated with such computer progams.

SUMMARY OF THE INVENTION

A primary object of the present invention is to provide an accessory for a computerized aircraft flight simulation computer program which provides a simulation of the tactile sensations, and degree of control which a pilot experiences in actually flying an aircraft. This object is achieved without requiring any modification of the computer flight simulation software program itself, and with only minor, if any, modifications to a conventional computer joystick assembly. To achieve this objective, a computer joystick is provided with a joystick lever extension which is of a size and shape that actually simulates a control stick on an aircraft. Moreover, tactile sensations simulating those sensations experienced in flying an aircraft are created by providing the joystick lever extension with orthogonally disposed springs which are maintained under tension. These springs exert a bias that simulates the bias transmitted to the control stick of an actual aircraft as a result of wind resistance that is encountered when the control stick is laterally deflected to perform certain maneuvers.

A further object of the invention is to enhance the realism of a computerized flight simulation software program by providing the system with a means for controlling the trim of an aircraft in the same manner that is employed in an actual aircraft. The trim control is provided by altering the bias of the opposing springs that exert opposing forces on the joystick extension. A spring bias adjustment is performed by turning rotatable wheels in the same manner that trim control is typically performed in an actual aircraft cockpit. The trim control wheels of the flight simulation accessory of the invention will tend to increase or decrease the forward or rearward right or left biasing force that is exerted upon the joystick lever extension in its neutral position.

These trim control wheels provide for a more realistic "feel" as found when actually setting trim in an aircraft.

A further object of the invention is to provide an accessory for a home computer flight simulation software program which can be used to adjust the dead center position of the joystick, so as to bring the position of the joystick extension into complete conformity with the position of the computer joystick control lever. The spring adjusting mechanisms provided as part of the flight simulation accessory allow a user to correct for any minor misalignment between the joystick lever extension and the computer joystick by appropriately altering the spring bias on the joystick lever extension.

While the improvement of the invention is primarily directed toward enhancing the realistic synthesis of forces which actually affect a real aircraft in flight, the accessory of the invention may include features which allow it to be used with computer flight simulation programs which simulate air combat, as well as proficiency in flying. In this connection conventional computer joystick control levers typically include a depressible button in an exposed upper extremity of the lever. In some computer aircraft flight simulation programs this button is used to simulate firing of guns or rockets from an aircraft in flight. When a button is depressed there is a visual display on the CRT indicative of firing of a gun or rocket. Accordingly, in a preferred embodiment of the invention the joystick lever extension handle is equipped with a button actuating rod operable from the upper extremity of the joystic lever extension for remotely depessing the depressible button in the movable lever of the computer joystick assembly. With such a construction the depressible button of the computer joystick contol lever may be remotely actuated from the top of the joystick extension handle of the accessory of the invention. The position of this button is as would be found in an actual fighter aircraft.

In one broad aspect the present invention may be considered to be an improvement to a computer loaded with an aircraft flight simulation program and in which operator inputs are provided for manipulating a movable lever of a computer joystick assembly relative to the housing of the computer joystick assembly in which the computer joystick assembly is connected to the computer by means of an umbilical connecting cable. The improvment of the invention is comprised of a joystick control including a mounting base, means for securing the computer joystick assembly housing on the mounting base, a joystick lever extension at least fifteen inches in length coupled as a linear extension of the computer joystick lever, pedestal means projecting upwardly from the base, four pulleys mounted by swivels on the pedestal means above the base and located orthogonally about the movable lever of the computer joystick assembly, four springs secured at orthogonal connections to the joystick lever extension, wherein each of the springs is held in tension and extends over a separate one of the pulleys and is secured to the pedestal means beneath the pulleys, and means for independently adjusting tension on adjacent ones of the springs.

In another broad aspect the present invention may be considered to be an accessory for a computerized aircraft flight simulation program which employs a computer joystick assembly including a housing and a control lever joined to the housing by a pivot connection to provide electronic signals responsive to the orientation of the control lever relative to the housing.

The accessory is comprised of a mounting base and means for immobilizing the computer joystick assembly housing on the base so that the control lever extends outwardly therefrom. The accessory includes an extension handle of at least fifteen inches in length and having a handgrip thereon coupled to the control lever as a linear extension thereof. A first pair of mounting posts extend upwardly from the base diametrically opposite each other from the pivot connection. A first pair of pulleys are provided, each of which is mounted by a swivel connection atop one of the posts in the first pair of posts. A first pair of springs are provided and are maintained in tension and secured to diametrically opposite sides of the extension handle and extend outwardly therefrom. Each spring in the first pair of springs passes over one of the pulleys in the first pair of pulleys and is secured to a separate one of the posts in the first pair of posts between the pulley thereon and the base. A means is provided for adjusting tension on at least one of the springs in the first pair of springs.

A second pair of mounting posts extend upwardly from the base diametrically opposite each other from the pivot connection and in perpendicular alignment relative to the first pair of posts A second pair of pulleys are provided, each of which is mounted by a swivel connection atop one of the posts in the second pair of posts. A second pair of springs are maintained in tension and are secured to the extension handle ninety degrees apart from the springs in the first pair of springs and diametrically opposite each other. Each spring in the second pair of springs passes over one of the pulleys in the second pair of pulleys and is secured to a separate one of the posts in the second pair of posts between the pulley thereon and the base. A means is provided for adjusting tensions on at least one spring in the second pair of springs.

The invention may be described with greater clarity and particularity by reference to the accompanying drawings.

DESCRIPTION OF THE DRAWINGS

FIG. 1 is a top plan view of an accessory for a computerized aircraft flight simulation program according to the invention.

FIG. 2 is an elevational view taken along the lines 2—2 of FIG. 1.

FIG. 3 is an elevational view taken along the lines 3—3 of FIG. 1.

FIG. 4 is a sectional elevational detail showing the internal construction of the joystick extension handle and the interconnection of the extension handle to the computer joystick control lever.

FIG. 5 is a functional block diagram illustrating the functional organization of the accessory of the invention with a computer and a computer joystick assembly.

DESCRIPTION OF THE EMBODIMENT

FIGS. 1, 2 and 3 illustrate a joystick control accessory 10 especially adapted for use with a computer 11 loaded with an aircraft flight simulator program, as indicated in FIG. 5. As is typical, the computer employs a joystick assembly indicated generally at 12. The joystick assembly has a housing 14 and a computer joystick lever 16. The joystick lever 16 is joined to the housing 14 at a pivot connection 17 formed by a ball and socket pivot joint in which a spherical extremity 18 of the computer joystick lever 16 is entrapped within a socket defined within a concave recess 20 in the upper surface of the plastic computer joystick assembly housing 14 in the manner depicted in FIG. 4.

The joystick assembly 12 is connected to a personal home computer 11 in the conventional manner by means of an umbilical connecting cable 22 which emanates through a lateral opening in one of the upright walls of the rectilinear plastic joystick assembly housing 14. One suitable commercially available embodiment of a computer joystick assembly which may be utilized as the computer joystick assembly 12 is sold as the Mach III joystick manufactured by CH Products located at 1558 Osage St., San Marcos, Calif. 92069.

The computer aircraft simulation accessory 10 of the invention is a joystick control which is comprised of a mounting base 24, means in the form of slotted slides 26 for securing the joystick assembly housing 14 on the mounting base 24, a joystick lever handle 28 having a handgrip 30 thereon and coupled to the computer joystick lever 16 as a linear extension thereof in the manner depicted in FIG. 4. The joystick lever extension 28 is at least fifteen inches in length.

Pedestal means are provided in the accessory 10 in the form of first, second, third and fourth upright mounting posts 32, 34, 36 and 38, respectively. The posts 32, 34, 36 and 38 project upwardly from the base 24 and are secured thereto by means of screws that extend upwardly though the bottom of the mounting base 24. First, second, third and fourth pulleys 42, 44, 46 and 48 are mounted above the base 24 on the pedestal mounting posts 32, 34, 36 and 38, respectively by means of swivels. The pulleys 42, 44, 46 and 48 are located orthogonally about the pivot connection of the movable lever 16 of the computer joystick assembly 12 and the lever extension 28, as best depicted in FIG. 1. Four springs, 52, 54, 56 and 58 are secured at their upper interior ends at orthogonal connections to the joystick lever extension 28 on an annular spring mounting flange 60 disposed coaxially about the extension handle 28. Each of the springs 52, 54, 56 and 58 extends perpendicular to one of the four sides of the computer joystick housing 14. Each of the springs is held in tension and extends over a separate one of the pulleys 42, 44, 46 and 48 and is secured to an associated one of the pedestal posts 32, 34, 46 and 38 beneath the pulleys 42-48. Means are provided for independently adjusting tension o each of two adjacent ones of the springs 52-58. Specifically, an elevator trim control adjustment assembly 62 is mounted on the pedestal post 38 to adjust tension in the spring 58 while a rudder trim control adjustment assembly 64 is mounted on the pedestal post 36 to adjust tension in the spring 36.

The slides 26 are releasably securable to the posts 32, 34, 36 and 38 by means of wing nuts 66 which are engaged with screws that pass through transverse openings in the bases of the posts 32, 34, 36 and 38. Horizontal slots 68 are defined in each of the slides 26.

The slides 26 which are arranged in pairs are linearly reciprocal relative to each other. That is, as viewed in FIG. 2, the first pair of slides 26 may be moved closer to each other or further apart, sliding along the parallel surfaces of the posts 32 and 36 when the wing nuts 66 are loosened. The interior facing ends of the slides 26 may thereby be brought to bear against the upright walls of the housing 14 of the computer joystick assembly 12. In this way the separation between the slides 26 that are securable to the posts 32 and 36 is selectively variable, so that the slides 26 can grip the housing 14 therebetween. When the slides 26 are moved into abutment against the upright walls of the housing 14 of the computer joystick assembly 12, the wing nuts 66 are tightened. The slides 26 which are attached by wing nuts 66 to the upright posts 34 and 38 form a second slide pair and can be moved linearly reciprocal relative to each other to likewise bear against opposite upright walls of the housing 14. The housing 14 is thereby totally immobilized by the inwardly directed orthogonally forces exerted by the four slides 26.

The posts 32, 34, 36 and 38 are arranged into two opposing pairs. That is, the posts 32 and 36 are located on opposite sides of the computer joystick assembly 12 and form a first pair of mounting posts, while the posts 34 and 38 likewise extend upwardly from the base 24 diametrically opposite each other from the pivot connection 17 and in perpendicular alignment relative to the first pair of posts 32 and 36. The posts 34 and 38 form the second pair of mounting posts. The normal position of a pilot in an aircraft, as viewed with respect to FIG. 1, would be behind the mounting post 38 facing forwardly toward the opposite mounting post 34 across the mounting base 24.

The mounting posts 32 and 36 in the first pair of mounting posts are separate structures which rise upwardly a distance of about eight and one half inches above the mounting base 24. At the top of the mounting posts 32 and 34 a pair of yokes or forks 72 and 74 are respectively mounted by swivel connections so as to rotate about generally vertical axes. That is, the pulley mounting forks 72 and 76, depicted in FIG. 2, can rotate both clockwise and counterclockwise upon the top of the mounting posts 32 and 36 as viewed in the plan view of FIG. 1. Similarly, the pulley mounting forks 74 and 78, depicted in FIG. 3, are likewise respectively mounted atop the mounting posts 34 and 38 at a height of about eight and one half inches by means of swivel connections. The pulley mounting forks 74 and 78 can likewise rotate in both clockwise and counterclockwise directions, as viewed in FIG. 1.

The pulley mounting forks 72, 74, 76 and 78 each have a pair of inwardly extending arms within which an associated pulley 42, 44, 46 or 48 is carried to turn in rotation about a generally horizontal axis. The pulleys 42, 44, 46 and 48 are located orthogonally about the movable computer joystick lever 16 and the joystick lever extension 28.

The joystick lever extension 28 is comprised of an outer, annular metal tube 80. The annular spring mounting flange 60 is permanently secured to the tube 80 at a location about ten and one half inches above the upper surface of the mounting base 24. The four springs 52, 54, 56 and 58 are secured at orthogonal connections to the joystick lever extension 28 by means of wire brads which extend into the structure of the flange 60 at spaced, ninety degree intervals.

The springs 52, 54, 56 and 58 are coil springs having an outer diameter of about one half of a centimeter and an overall effective lengh of approximately eight and three quarter inches in their slackened condition. The spring constant of the springs 52, 54, 56 and 58 may be about six ounces per inch of elongation. When installed as illustrated in the drawings, all of the springs are held in tension and are stretched to a length of approximately thirteen inches. Each of the springs 52, 54, 56 and 58 extends over a separate one of the pulleys 42, 44, 46 and 48, as illustrated, and is secured to the pedestal upon which the associated pulley is mounted beneath the pulley and proximate to the mounting base 24.

The alignment of the mounting posts 34 and 38 corresponds to the fore and aft alignment of an aircraft, with the location of the mounting post 34 on the mounting base 24 corresponding to the forward direction and with the location of the mounting post 38 corresponding to the aft direction. The adjustment mechanism 62 provides a means for a person operating the computerized flight simulation program to effectuate simulated elevator trim control.

The adjustment mechanism 62 for adjusting tension in the second pair of springs 54 and 58 is best illustrated in FIG. 3 and is comprised of a generally horizontally disposed lever arm 82 directed inwardly toward the housing 14 of the computer joystick assembly 12 and toward the joystick lever extension 28 and the opposite post 34 in the second pair of posts. The lever arm 82 is mounted at a fulcrum 84 on a mounting ear 86 secured to the outer edge of the mounting post 38 as illustrated in FIG. 3. The upper end of the spring 54 is anchored to the spring mounting flange 60 in the manner previously described, and is held in tension to extend over the pulley 44. The lower end of the spring 54 is secured to the mounting post 34 by a hook 88 proximate to the mounting base 24.

The upper interior end of the spring 58 is likewise connected to the flange 60 and extends over the pulley 48. The lower end of the spring 58 is hooked about a tang 90 on the inwardly directed end of the lever arm 82. The tang 90 is located in spaced separation from the fulcrum 84 on the lever arm 82 and a means is provided for raising and lowering the lever arm 82 in rotation about the fulcrum 84, thereby varying the extended length of the spring 58 anchored thereto.

The means for raising and lowering the tang 90 of the lever arm 82 is formed by an externally threaded rod 92 which is coupled to the lever arm 82 by means of a stiff metal wire hook 94. The threaded rod 92 has conventional right hand threads. The hook 94 is an L-shaped structure having a generally upright portion which is secured in an axial bore in the lowermost end of the threaded rod 92. The hook 94 does not rotate when the threaded rod 92 is turned in rotation but is carried upwardly and downwardly by the translational movement of the rod 92. It is quite important for the axial bore in the lower end of the threaded rod 92 to be precisely on center, since the hook 94 will otherwise wobble when the threaded rod 92 is turned in rotation. If the hook wobbles it causes inconsistant amount of trim to be introduced making it very difficult to trim out the aircraft accurately.

The threaded rod 92 extends through a block 98 near the upper end of the mounting post 38. Within the block 98 there is an internally threaded collet 100, which may take the form of a conventional hexagonal nut. The collet 100 is immobilized from rotation within the block 98 and is mounted on the same mounting post 38 as the fulcrum 84. The threaded rod 92 is threadably engaged in the collet 100. A flat, disk-shaped wheel 102 is firmly attached to the upper end of the threaded rod 92 and has a scalloped peripheral edge to provide fingergrips to facilitate rotation.

When the wheel 102 is rotated in a clockwise direction, as viewed in FIG. 1, the threaded rod 92 is advanced downwardly within the threaded collet 100. The stiff hook 94 forces the lever arm 82 downwardly in clockwise rotation, as viewed in FIG. 3, thereby increasing tension on the spring 58. Since the spring 58 acts in direct opposition to the spring 54, tension is increased on the spring 54 as well, and the neutral position of the joystick extension lever 28 is pulled to the left, as viewed in FIG. 3.

The physical manipulation of the wheel 102 in the clockwise direction corresponds precisely with the same manipulation which a pilot uses to adjust trim control within the cockpit of a real aircraft to tilt the nose of an aircraft upwardly. Such a trim adjustment would be the appropriate adjustment to make if a pilot wanted to maintain altitude while decreasing power. Conversely, counterclockwise rotation of the knob 62, as viewed in FIG. 1, will draw the threaded rod 92 upwardly within the collet 100, thus rotating the lever arm 82 in a counterclockwise direction, as viewed in FIG. 3. Such an adjustment conforms precisely to the trim control which a pilot would take in a conventional aircraft to bring the nose of the aircraft down. This type of adjustment is the appropriate trim adjustment for a pilot to make when wanting to maintain his present altitude while increasing power.

The manner of effectuating trim control utilizing the adjustment mechanism 62 in simulating flight is unique to the present invention. The computer joystick assembly 12, which is conventionally used as the sole means of operator control in a flight simulation computer program, provides no corresponding means for trim adjustment. Thus, the trim control mechanism 62 supplies a dimension of realism to a person operating a computerized flight simulation program which has heretofore been unavailable.

Rudder trim control is likewise achieved with a similar spring tension adjusting mechanism. The alignment of the mounting posts 32 and 36 in the first pair of mounting posts is perpendicular to the alignment of the mounting posts 34 and 38 in the second pair. Movement of the joystick lever extension 28 toward the mounting post 36 corresponds to a joystick movement in a real aircraft which would operate the aircraft rudder to turn the aircraft to the right. Conversely, movment of the joystick lever extension 28 toward the mounting post 32 corresponds to a movement that would turn a conventional aircraft to the left.

As illustrated in FIG. 2, a lever arm 104 is mounted on the mounting post 36 at a fulcrum 106 on a mounting ear 108 that projects outwardly away from the joystick lever extension 28 on the backside of the mounting post 36. The lever arm therefore is directed toward the joystick lever extension 28 and toward the opposite post 32 in the first pair of posts. The upper, interior end of the spring 52 is anchored to the spring mounting flange 60 in the manner previously described, and the spring 52 extends over the pulley 42 and terminates at a lower end which is anchored to a hook 110 proximate to the mounting base 24 and beneath the pulley 42. The other spring 56 in the first pair of springs is likewise anchored to the spring mounting flange 60 and exerts force directly opposing the force of the spring 52. The spring 56 passes over the pulley 46 and is anchored to a tang 110 on the end of the lever arm 104. The tang 110 is located on the lever arm 104 opposite the fulcrum 106 and in spaced separation therefrom.

The spring tension adjusting mechanism 64 performs the function of raising and lowering the lever arm 104 in rotation about the fulcrum 106, thereby varying the extended length of the spring 56 anchored thereto. The adjustment mechanism 64 is comprised of an internally threaded collet 112 mounted in a mounting block 114 that is secured to the mounting post 46. The collet 112 may take the form of a conventional hexagonal nut having internal right-hand threads and is immobilized from rotation relative to the mounting block 114. The adjustment mechanism 64 is further comprised of an externally threaded rod 116 which is coupled to the lever arm 104 by means of an L-shaped hook 118. The upwardly projecting portion of the hook 118 must be perfectly centered within a axial bore in the lowermost end of the threaded rod 116. The adjustment mechanism 64 has a wheel 120 with a knurled peripheral edge secured to its upper end to facilitate manual rotation of the threaded rod 116.

Rotation of the wheel 120 in a clockwise direction, as viewed in FIG. 1, will advance the threaded rod 116 downwardly relative to the collet 112. Since the hook 118 is engaged with the lever arm 104 in close proximity to the fulcrum 106, even a small advancement of the threaded rod 116 will produce a significant counterclockwise movement of the tang 110 to thereby increase tension on the spring 56. Increased tension on the spring 56 will pull the joystick lever extension 28 to the right, as viewed in FIG. 2. This will have the effect of reestablishing the neutral position of the joystick extension lever 28 in such a manner as to impart a rudder bias that would tend to turn a real aircraft to port. Such an adjustment would be appropriate in the cockpit of a real aircraft where a pilot experiences a prevailing crosswind from the port side of the aircraft.

Conversely, rotation of the wheel 120 in a counterclockwise direction, as viewed in FIG. 1, has the result of retracting the threaded rod 116 upwardly within the collet 112. The hook 118 thereby pulls the lever arm 104 upwardly in clockwise rotation, as viewed in FIG. 2, thereby raising the lower arm 104 and the tang 110. This has the result of reducing tension on the spring 56. The resultant forces of the springs 52 and 56 will thereupon allow the spring 52 to pull the joystick lever extension 28 to the left, as viewed in FIG. 2. This reestablishes the neutral position of the joystick lever extension 28 and the computer joystick lever 16 to a position which would exert a rudder bias tending to turn an aircraft to starboard. Such an adjustment is appropriate in a real aircraft when a pilot experiences crosswinds from the starboard side.

With the adjustment mechanisms 62 and 64 a person operating a computerized aircraft flight simulation program will be able to establish both elevator and rudder trim control in a realistic fashion. Moreover, the joystick lever extension 28, unlike the computer joystick lever 16, is of a size and configuration which realistically simulates the control stick in an actual aircraft. The length and tension exerted by the springs 52, 54, 56 and 58 provides resistance to movement of the joystick lever extension 28 that approximates the forces which a pilot would actually experience in manipulating the control stick of a real aircraft.

The joystick lever extension 28 may be moved in any of the four orthogonal directions in alignement with the first and second pairs of mounting posts, or in intermediate directions to impart the full range of flight control affected by aileron, elevator and rudder movement. The pulley mounting forks 72, 74, 76 and 78 will swivel so that the springs 52, 54, 56 and 58 will not be pulled laterally off their respective pulleys 42, 44, 46 and 48.

The tension adjusting mechanisms 62 and 64 serve still another purpose besides providing elevator and rudder trim control. Specifically, these tension adjusting mechanisms may be utilized to provide minor corrections to any misalignment between the joystick lever extension 28 and the computer joystick lever 16. That is, the knobs 102 and 120 may be turned as appropriate to tilt the joystick lever extension 28 as appropriate to achieve a exact neutral position corresponding to the neutral position of the computer joystick lever 16 that is required by the computerized flight simulation program. Thus, even if there is any minor variation in alignment between the computer joystick control lever 16 and the joystick lever extension 28, the necessary correction may be made to zero out such an error by manipulation of the knobs 102 and 120.

The interconnection of the joystick lever extension 28 with the computer joystick control lever 16 is illustrated in detail in the sectional view of FIG. 4. The computer Joystick control lever 16 is formed of an outer, hollow, annular tube 121 within which is located a plunger 122. The plunger 122 is frequently used to initiate a firing action in many computer games, and is utilized for the same purpose in some computerized aircraft flight simulation programs. The computer Joystick control lever 16, as originally supplied in a conventional construction, includes a generally dome-shaped annular cap which fits atop the tube 121 and is secured thereto by peripheral, downwardly extending screws. The dome-shaped cap is equipped with a centrally located actuator which is spring biased upwardly, but which can be depressed to force the plunger 122 vertically downwardly. The upper extremity 124 of the plunger 122 may be considered to be a depressible button, which may be pushed downwardly by downward pressure on an actuator located in the central opening of the dome shaped cap of the computer joystick contol lever 16 as originally supplied by the manufacturer. The plunger 122 is normally biased upwardly by a conventional spring within the control lever 16 which is not visible in the drawings.

To secure the joystick lever extension 28 to the computer joystick control lever 16, the dome-shaped cap originally supplied with the lever 16 is removed, and the joystick lever extension 28 is coaxially positioned in longitudinal alignment directly above the lever 16. The outer tube 80 of the joystick lever extension 28 terminates at its lower extremity in a outwardly turned, radial flange 125 having apertures therethrough which align with the apertures in the upper end of the lever 16 by means of which the original dome-shaped top of the control lever 16 is attached. Once the dome-shaped cap has been removed, the same screws 126 which were originally utilized to attach the dome-shaped cap to the tube 121 are employed to attach the flange 125 of the tube 80 to the outer tube 121 of the computer joystick control lever 16, as illustrated.

To further secure the joystick lever 28 to the computer joystick control lever 16, a plastic spacing bushing 128 is provided coaxially about the lower extremity of the tube 80 and seats upon the flange 125. An annular, rubber boot 130 is disposed about and grips the spacer bushing 128 above the interface between the joystick lever extension 28 and the computer joystick control lever 16. The boot 130 is resiliently deformable, and grips the outer surface of the tube 121 of the computer Joystick control lever 16 below the interface with the Joystick lever extension 28, in the manner depicted. Thus, a secure coupling is created between the joystick extension lever 28 and the computer joystick control lever 16.

Within the joystick lever extension 28 there is an elongated plastic button actuating rod 132 which extends the length thereof coaxially within the tube 80. A hollow, downwardly facing cup-shaped cavity 133 is defined in the lowermost extremity of the rod 132 and is adapted to receive the upwardly projecting depressible button 124 of the plunger 122. At the upper extremity of the button actuating rod 132 there is a radial flange 134 and a depressible button 136 located directly thereabove. The handgrip 30 is formed with a cylindrical passageway sized to tightly grip the outer surface of the tube 80. The handgrip 30 is formed of resiliently deformable rubber, and has a radially inwardly projecting bearing ledge 140 which limits the upward movement of the depressible button 136 and the flange 134. Above the tube 80 the diameter of the passageway within the grip 30 is enlarged at 142 to accomodate reciprocal movement of the flange 134.

When the user grips the handgrip 30, the fingers of the gripping hand will wrap around the contoured surface of the handicap 30. The thumb can then be easily positioned directly above the depressible button 136. By simply squeezing the thumb downwardly, the button 136 can be forced downwardly, overcoming the force of the spring within the joystick assembly 12 which biases the plunger 122 upwardly so that the blind end of the cavity 133 in the button actuating rod 132 forces the depressible button 124 in the computer joystick control lever 16 downwardly, thereby overcoming the spring bias. Thus, the depressible button 124 in the computer joystick control lever 16 can be remotely actuated by means of the button 136 in the handgrip 30 and the button actuating rod 132. As a result, the user is able to provide a signal to the programmed computer indicating an action of firing a rocket or gun. When the user lifts the thumb of the hand gripping the handgrip 30 from the depressible button 136, the joystick assembly spring lifts the plunger 122 and button actuating rod 132 upwardly.

Undoubtedly, numerous variations and modifications of the invention will become readily apparent to those familiar with computerized aircraft flight simulation programs. For example, many aircraft now employ a wheel, rather than a generally linear lever. With a modification of the mechanism interconnecting the computer joystick control lever 16, a wheel could be substituted for the joystick lever extension 28 in the embodiment illustrated and described herein. Accordingly, the scope of the present invention should not be construed as limited to the specific embodiment depicted and described, but rather is defined in the claims appended hereto.

I claim:

1. In a computer loaded with an aircraft flight simulation program and in which operator inputs are provided by manipulating a movable lever of computer joystick assembly relative to the housing of said computer joystick assembly and wherein said computer joystick assembly is connected to said computer by means of an umbilical connecting cable, the improvement comprising a joystick control including a mounting base, means for securing said computer joystick assembly housing on said mounting base, a joystick lever extension at least fifteen inches in length coupled as a linear extension of said computer joystick lever, pedestal means projecting upwardly from said base, four pulleys mounted by swivels on said pedestal means above said base and located orthogonally about said movable lever of said computer joystick assembly, four springs secured at orthogonal connections to said joystick lever extension, wherein each of said springs is held in tension and extends over a separate one of said pulleys and is secured to said pedestal means beneath said pulleys, and means for independently adjusting tension on each of two adjacent ones of said springs.

2. The improvement according to claim 1 wherein said pedestal means is comprised of four, separate upright posts atop each of which one of said pulleys is mounted, and said means for adjusting tension includes at least one lever arm secured to one of said posts at a fulcrum and extending inwardly toward said joystick lever extension, and wherein an end of one of said springs remote from a connection to said joystick lever extension is secured to said lever arm, an interiorally threaded adjustment rod mounting secured to said one of said posts, an externally threaded adjustment rod threadably engaged with said adjustment rod mounting and connected to said lever arm, and a manually rotatable wheel secured to said adjustment rod.

3. The improvement according to claim 2 wherein said movable lever of said computer joystick assembly is equipped with a depressible button on its upper extremity, and said joystick lever extension is equipped with a button actuating rod operable from the upper extremity of said joystick lever extension for remotely depressing said depressible button in said movable lever of said computer joystick assembly.

4. An accessory for a computerized aircraft flight simulation program which employs a computer joystick assembly including a housing and a control lever joined to said housing by a pivot connection to provide electronic signals responsive to the orientation of said control lever relative to said housing comprising:

a mounting base, means for immobilizing said computer joystick assembly housing on said base so that said control lever extends upwardly therefrom, an extension handle at least fifteen inches in length and having a handgrip thereon coupled to said control lever as a linear extension thereof, a first pair of mounting posts extending upwardly from said base diametrically opposite each other from said pivot connection, a first pair of pulleys each of which is mounted by a swivel connection atop one of said posts in said first pair of posts, a first pair of springs maintained in tension and secured to diametrically opposite sides of said extension handle and extending outwardly therefrom, and each spring in said first pair of springs passes over one of said pulleys in said first pair of pulleys and is secured to a separate one of said posts in said first pair of posts between the pulley thereon and said base, means for adjusting tension on at least one spring in said first pair of springs, a second pair of mounting posts extending upwardly from said base diametrically opposite each other from said pivot connection and in perpendicular alignment relative to said first pair of of posts, a second pair of pulleys each of which is mounted by a swivel connection atop one of said posts in said second pair of posts, a second pair of springs maintained in tension and secured to said extension handle ninety degrees apart from said springs in said first pair of springs and diametrically opposite each other, and each spring in said second pair of springs passes over one of said pulleys in said second pair of pulleys and is secured to a separate one of said posts in said second pair of posts between the pulley thereon and said base, and means for adjusting tension on at least one spring in said second pair of springs.

5. An accessory according to claim 4 wherein said means for immobilizing is comprised of a slide releasably securable to each of said posts, and said slides which are releasably securable to the posts in each pair of posts are linearly reciprocal relative to each other, whereby the separation between slides securable to the posts within each pair of posts is selectively variable.

6. An accessory according to claim 4 wherein said means for adjusting tension in said first pair of springs is comprised of a lever arm mounted at a fulcrum on one of said posts in said first pair of posts and is directed at the opposite of said posts in said first pair of posts, and one of said springs in said first pair of springs is anchored to said lever arm in spaced separation from said fulcrum, and a means is provided for raising and lowering said lever arm, thereby varying the extended length of said spring anchored thereto.

7. An accessory according to claim 6 further comprising an internally threaded collet mounted on the same post as said fulcrum, and an externally threaded rod coupled to said lever arm and threadably engaged in said collet, and having a wheel thereon to facilitate manual rotation of said rod.

8. An accessory according to claim 4 wherein said means for adjusting tension in said second pair of springs is comprised of a lever arm mounted at a fulcrum on one of said posts in said second pair of posts and is directed at the opposite of said posts in said second pair of posts, and one of said springs in said second pair of springs is anchored to said lever arm in spaced separation from said fulcrum, and a means is provided for raising and lowering said lever arm thereby varying the extended length of said spring anchored thereto.

9. An accessory according to claim 8 further comprising an internally threaded collet mounted on the same post as said fulcrum, and an externally threaded rod coupled to said lever arm and threadably engaged in said collet, and having a wheel thereon to facilitate manual rotation of said rod.

10. An accessory according to claim 4 wherein said control lever of said computer joystick assembly includes a depressible button in its exposed end and said extension handle is comprised of a tube upon which said handgrip is mounted, and a button actuation rod reciprocally mounted within said tube, means protruding from said handgrip for forcing said actuating rod longitudinally to depress said button.

11. A joystick control for use with a computer loaded with an aircraft flight simulator program and with a computer joystick assembly having a housing and a computer joystick lever electronically coupled to provide inputs to said computer comprising:

a mounting base, means for immobilizing said computer joystick housing on said mounting base, first, second, third and fourth mounting posts rising from said mounting base and radially located at ninety degree intervals relative to said joystick lever of said computer joystick assembly, a joystick lever extension, at least fifteen inches in length with a handgrip thereon coupled in longitudinal alignment to said computer joystick lever, a pulley mounting means connected to the top of each of said posts by a swivel, a pulley mounted in each of said pulley mounting means, first, second, third and fourth springs coupled to said joystick lever extension and extending radially therefrom at ninety degree intervals to extend over said pulleys in tension wherein said first, second, third and fourth springs are respectively secured to said first, second, third and fourth mounting posts between the pulley associated therewith and said base, and means for adjusting tension on at least two of the aforesaid springs that are located ninety degrees apart.

12. A joystick control according to claim 11 wherein said springs are all secured to said mounting posts proximate to said mounting base.

* * * * *